United States Patent Office 3,456,986
Patented July 22, 1969

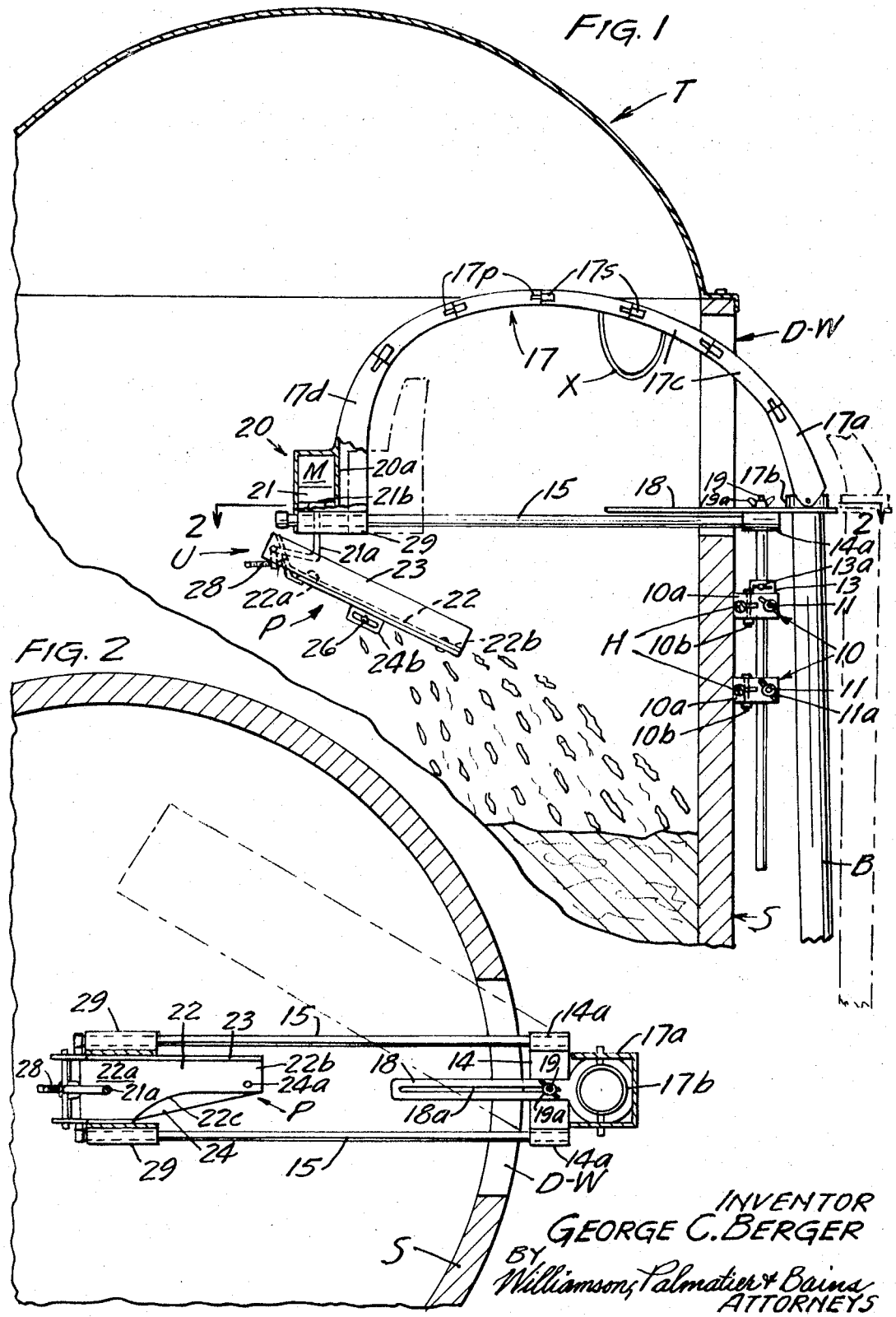

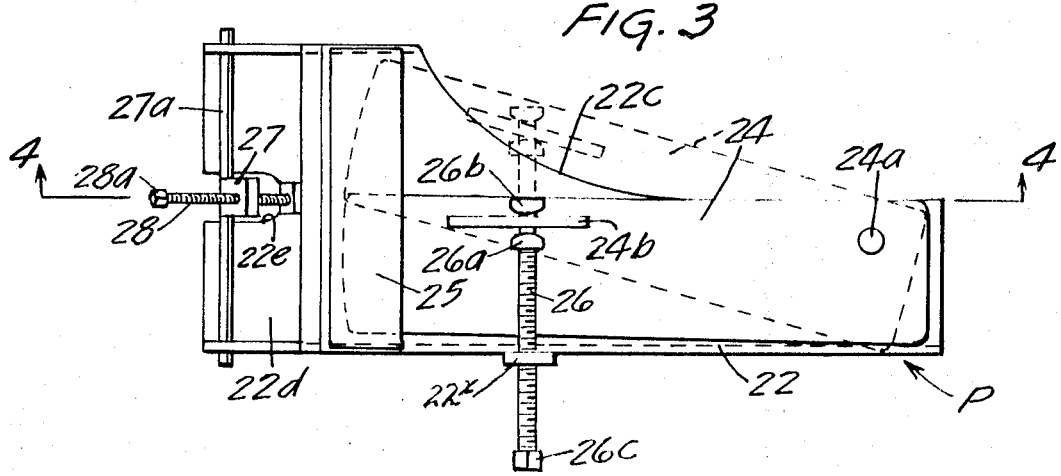
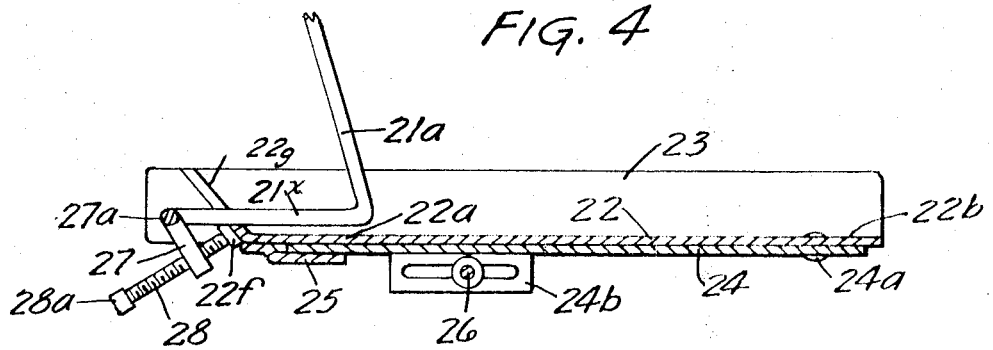
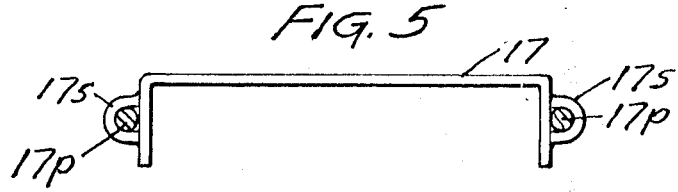

3,456,986
POWERED SILAGE DISTRIBUTOR WITH ADJUSTMENTS FOR VARIABLY POSITIONING AND CONTROLLING FLOW
George C. Berger, Erskine, Minn. 56535
Filed June 14, 1967, Ser. No. 646,090
Int. Cl. B65g 53/40
U.S. Cl. 302—60        5 Claims

ABSTRACT OF THE DISCLOSURE

A powered distributor assembly for silage and other coarse and sticky forage crops, having readily controllable adjustments for variably positioning the center and delivery end of a declined dispensing-pan medium within the interior confines of conventional silos of all dimensions, and also having adjustment mechanism for variably controlling the width of the stream of silage dispensed as well as the inclination of the distributor-pan. Additional important features reside in the support of the adjustable mounting and positioning mechanism from a framed opening such as a doorway in the upper portion of the silo, with controls for angularly positioning a mounting rail variably with reference to the doorway and for also longitudinally adjusting the position of the distributor unit on the mounting rail, all adjustments being operative and accessible from the doorway of the silo.

Silage and other coarse sticky forage feed materials have commonly been distributed into silos and vertical bins by discharge from an upstanding spout connected with a blower or mechanical elevator. The discharge at the upper end of said spout is directed upwardly and sometimes slightly inwardly of the silo near the top thereof. Without additional mechanical facilities, the discharged material heaps up at a point directly below or at one side of the spout opening, concentrating bulk density in a core portion of the accumulating material and producing an exceedingly uneven distribution within the full height of the silo. Because of this, it has been necessary to employ one or two workers with shovels within the silo to move material laterally and circumferentially while it is being distributed. Such work is obnoxious because of dust and heat conditions and the cost of the labor is an important factor.

This invention is an improvement on my silage distributor disclosed in my pending U.S. patent application, S.N. 501,336, filed Oct. 22, 1965. The structure of said earlier application has proven reasonably efficient and adequate when used with silos having a diameter within a narrow predetermined range. However, in the distribution of sticky, chunky material such as silage wherein shape factors and size vary substantially, I have found that it is desirable to make provision during the filling of any silo for adjustment of the orbit of distribution relative to the cross sectional area of the silo, sometimes frequently in the complete filling of any silo.

It is an object of my present invention to provide an improved powered silage distributor of the class described, having novel means for variably adjusting the position of a revolving distributor pan within the confines of the silo, as well as having means for varying the width of flow of material from a declined pan, together with variable adjustment of the inclination of said pan.

More specifically it is an object to provide a distributor of the class described wherein all adjustments for distribution flow are readily controllable during the filling of any silo from the edge of a hatchway or doorway conventionally provided.

Another object is the provision of a powered silage distributor with flow-positioning and stream-varying facilities which make it universally effective for filling completely, silos and vertical bins of all conventional shapes and dimensions.

The foregoing and other objects will more fully appear in the following description made in connection with the accompanying drawings, wherein like reference characters refer to similar parts throughout the several views, and in which:

FIG. 1 is a vertical section taken diametrically through a cylindrical silo, having an embodiment of my invention radially positioned therein, and supported from the silo structure, parts of which extend through the doorway D–W; dotted lines indicating an adjusted position of the distributor unit;

FIG. 2 is a cross section taken on the 2—2 of FIG. 1, dotted lines disposed angularly of the full line structure, indicating an adjusted position of the mounting structure and distributor unit;

FIG. 3 is a bottom plan view of the dispensing pan provided with means for adjustment of inclination as well as adjustment of flow width;

FIG. 4 is a detail, longitudinal section taken substantially on the line 4—4 of FIG 3, showing the dispensing pan and its support and adjustment; and FIG. 5 is a detail end view of one of the sections of the inverted trough chute showing locking connection with pin 17p of the adjacent sections, said pins being firmly seated in socket sleeves 17s of the section shown in full lines.

Referring now to the details of the embodiment disclosed, the distributor assembly is operatively mounted upon and within a generally cylindrical conventional silo S, having a series of removable doors, usually vertically aligned, and the hatch or door uppermost in the silo being removed to open up a rectangular doorway D–W. The silo is provided with the conventional domed top T which is supported from and secured to the upper edge of the cylindrical silo wall. The silo shown is provided with a plurality of reinforcing hoops H spaced vertically apart and which adequately serve as an anchor and support for the mounting of my variably adjustable distributor assembly. It will of course be understood that in the case of certain silos which do not employ reinforcing hoops, brackets or equivalent supporting media may be secured and supported from the lower edge of the doorway, all within the scope of my invention.

As shown, a pair of heavy clamping brackets 10 are secured in vertical alignment to two adjacent reinforcing hoops H having the cooperating jaws 10a with bolts 10b for tightening the same. The outer ends of the clamping brackets 10 are tapped to engage set screws 11 which are provided with wing nuts 11a for facilitating tightening to predeterminately anchor a main, exterior vertical supporting shaft 12 therein. To support shaft 12 at variable heights upon the brackets 10 an independent support collar 13 is slidably mounted on the upper portion of shaft 12 and carries a set screw 13a for rigidly affixing the collar at variable heights within a range to shaft 12. The bottom of the collar 13a acts as a thrust bearing against the upper annular edge of the top clamping bracket 10. A crosshead 14 is rigidly affixed to the upper end of support shaft 12, also mounted exteriorly of the silo and having a pair of horizontally spaced heavy mounting sleeves 14a in which are secured parallel rails in the form if desired of metal tubes 15 which project inwardly of the silo from said crosshead and through said doorway D–W, having their inner ends interconnected for strength and alignment by a cross brace 16. I provide a preferably sectional, inverted trough or chute indicated as an entirety by the numeral 17, for guiding forcibly discharged silage from a conventional blower spout B to the overhanging portion of my distributor unit which is designated as an entirety by the letter U. The first section 17a of chute 17, the lower portion of which is disposed exteriorly of the silo, has a base sleeve 17b with circumferential flange for surrounding and interconnecting with the tip or discharge upper end of the blower spout B. It will be understood that blower spout B is tiltable from the position shown in FIG. 1 to a number of variable laterally and radially disposed positions, one of which is shown in dotted lines in FIG. 1. The circumferential base flange of sleeve 17b carries an elongated, inwardly extending horizontal attachment tongue 18 which as shown in FIG. 2 is longituidnally slotted at 18a for adjustable clamping upon an upstanding threaded stud 19 which is affixed to cross head 14 and which is connected with a winged clamping nut 19a.

The inverted guide chute 17 includes a plurality of readily disconnectible trough sections 17c which extend in concavely curved arrangement between the first section 17a and an outward trough section 17d which extends almost vertically and is rigidly affixed to the inner wall 20a of a motor and transmission housing 20. A motor M as shown, mounted in the upper portion of said housing may be electrical or fluid-actuated, having its armature shaft connected with transmission mechanism 21 having its driven and power take-off shaft 21a extending downward vertically, substantially centrally of the housing 20. The general curvature of the inverted chute 17 is shown in FIG. 1, of the nature of a French curve, the radius at the inner portion of the chute being lesser and increasing in radius constantly through the intermediate sections 17c of the chute. Various means may be employed for detachably and predeterminately interconnecting the chute sections 17a, 17c and 17d. As shown, each of the chute sections at portions near ends thereof on the side flanges have attachment sleeves 17s affixed thereto. The interconnecting sections have rigidly affixed, appropriately angled pins 17p which telescope within the cooperating sleeves of the adjustment chute section. The chute sections at the positions of interconnection are of inverted U-shaped cross section.

The depending powered shaft 21a is of heavy construction for supporting and revolving an adjustable dispensing-pan indicated as an entirety by the letter P. This pan assembly as may be better understood in detail by reference to FIGS. 3 and 4, is always disclosed in a declined position with its upper end supported from shaft 21a, but is angularly adjustable relative to shaft 21a through a considerable range by mechanism hereafter to be described. Pan assembly P has a principal pan body having a smooth flat bottom 22, widened at its upper portion 22a where the longitudinal edges are substantially parallel and then progressively tapered downwardly to its lower extremity 22b, the converging edge of the tapering portion being interconnected with the upper widened portion 22a by a concave arc portion 22c. The tapered edge, with arc portion 22c, is the leading edge of the pan in the revolution of the pan upon the supporting shaft 21a. The trailing edge of the pan body 22 is substantially a straight line and is provided with an upstanding narrow guide flange 23, which may be integrally formed with the pan bottom 22.

It will be understood that in the revolution of pan P a substantial amount of the distributed silage or other material slides downwardly of the pan and is delivered outwardly of the small end 22b thereof while a portion of the material falls laterally of the tapering edge or arcuate edge 22c. To provide variance of the tapering portion of the bottom of the pan, a rectangular adjustment plate 24 is provided, disposed substantially flush with the underside of bottom 22 and pivoted at the outer and smaller end of the pan on a pin 24a (see FIGS. 2, 3 and 4). The free or inner end of adjustment plate 24 is slidably confined by a keeper strip 25 having its main portion properly spaced below the bottom of pan 32 to receive and confine the swinging end of the elongated adjustment plate 24. To swingably adjust plate 24, suitable means are provided such as an elongated screw 26, rigidly carrying spaced abutments 26a and 26b at the outer portion thereof. A longitudinally slotted angle plate 24b is affixed longitudinally to the bottom of adjustment plate 24 and is interposed between the heads 26a and 26b. The medial portion of screw 26 is threadedly engaged with a depending, internally threaded lug 22x affixed to the bottom of the pan bottom 22 and its inner extremity is provided with a torque-applying element 26c such as the squared nut portion which may be engaged by an elongated socket wrench (with the trough properly positioned), manipulated by an operator from the door opening D–W.

Simple means are provided to angularly adjust the pan P relative to its support shaft 21a, as clearly shown in FIGS. 3 and 4. In the embodiment shown, the inclined inner end of pan P, numbered 22g, is provided on its underside with the reinforced jamb plate 22f against which an adjustment screw 28 is abutted. Screw 28 is threadedly and adjustably received in a rectangular internally threaded collar 27 which is rigidly affixed to a cross shaft 27a rigidly connected to the angled end 21x of the supporting driven shaft 21b. The ends of cross shaft 27a are journaled in bearing apertures provided by downturned flange portions provided by the upper and inner end of the pan.

Adjustment screw 28 is provided at its left hand end, as shown in FIGS. 3 and 4, with a torque-applying element 28a such as a squared head, to receive a complementary shaped socket wrench, manipulated by an operator through doorway D–W when the pan is revolved to a position swung approximately 180° from the position shown in FIG. 1. The angular adjustment of pan P relative to its revolving supporting, driven shaft 21a will of course determine the outward radius and orbit of material dropping from and centrifugally thrown by the lower declined end 22b of the pan, in operation.

The motor and transmission housing 20 and with it of course the vertical driven shaft 21a and the dispensing pan assembly P supported from said shaft, are bodily and longitudinally adjustable slidably of the trackway constituting in the form shown, the rigid metal tubes 15. To this end, inverted U-shaped shoes 29, spaced apart in accordance with the spacing of the track tubes 15 are affixed to the sides and bottom portion of housing 20 and slidably embrace tubes 15, supporting the housing therefrom. The distributor unit may be adjusted longitudinally within a range of several feet by shifting its position through the pushing or pulling of the rigidly interconnected, inverted chute 17. This may be effected by an operator positioned on a ladder or scaffold at the opening or doorway D–W. A depending looped hand grip X is provided to facilitate such adjustment. When the distributor unit is to be moved inwardly as shown in the dotted line position of FIG. 1, the blower spout B will be tilted outwardly, still received and retained at its upper end in the base sleeve 17b. It is of course necessary to loosen the anchoring wing nut 19a which clamps against the slotted tongue 18 to so adjust the distributor unit. It will be noted that chute section 17a is hingedly connected to its base sleeve 17b. Thereafter in the adjusted position the wing nut 19a is again securely tightened to retain the distributor unit and concave guiding trough in the desired longitudinally adjusted position. The aforesaid adjustment not only anchors the motor and transmission housing 20 in one of a number of adjusted positions, but also fixes and anchors the upper discharge end of the blower spout in a predetermined position communicating with the sleeve section 17a of the guiding chute.

Operation

In use my distributor assembly and apparatus is supported and positioned usually for the filling of the bottom portion of the silo, as shown in FIG. 1, where longitudinal adjustment of the housing 20 is made on the supporting track comprising rigid tubes 15 so that the driven supporting shaft 21a is approximately axially or centrally of the cross sectional area of the silo. Tubular rails 15 then extend substantially radially of the silo and the inclined position of pan P will then be at a greater angle to vertical shaft 21a than when the distributor is used for filling the upper portion of the silo, since the trajectories of silo particles with the increment of centrifugal force must be varied from the trajectories of silage material when the upper portion of the silo is to be filled.

It is to be understood that an operator supported by ladder or scaffold is stationed at doorway D–W at one side of the inverted, curved chute 17 and may adjust the angulation of pan P by applying torque through an elongated socket wrench to the adjustment nut 28 and may adjust the position of longitudinal adjustment plate 24 by applying torque to the adjustment screw 26. Of course, it is essential that proper revolution of the pan is first obtained to make the squared nuts 26c or 28a available and substantially close to alignment with the doorway D–W.

Adjustment of the entire distributor unit, including the housing 20, the inverted chute 17, and the pan P longitudinally of the track 15 may be accomplished by the operator in slightly lifting and pulling or pushing upon the handhold X, rigidly affixed to the bottom of chute 17.

Despite the original centering of the distributor unit U axially of the interior of the silo, subsequent adjustment for flow, falling and trajectories of silage and other coarse, sticky materials, is usually necessary during the filling of the silo from bottom to top level, although such adjustments are comparatively slight. Thus, if it is found that more dropping of silage is needed towards the portions of the cylindrical wall of the silo, disposed substantially transversely of the center line of the track 15, the retaining wing nuts 11a may be loosened and the two track tubes 15 and the cross head 14 may be swung slightly from the radial position towards that portion of the silo wall where greater distribution of material is needed. This may be readily accomplished by the operator on the scaffold or ladder.

If the distribution of material is lacking at the periphery of the silo opposite from doorway D–W, then the distributor unit U may be bodily adjusted longitudinally outward of the supporting track comprising rigid tubes 15. Likewise, if greater dropping of silage material is needed near the inner periphery of the silo adjacent doorway D–W, the distributor unit may be bodily moved longitudinally and inwardly of the parallel supporting tubes 15, such as to the dotted line position shown in FIG. 1.

As the silo becomes filled with material, from bottom towards the top, it is usually desirable to adjust the inclination of pan P to lessen its angular relation to the vertical supporting driven shaft 21a. This causes the trajectories of material centrifugally thrown from the smaller outer end 22b of the pan, to be increased for filling of the upper portion of the silo. Likewise, it is quite often desirable to lessen the lateral dropping off of material from the leading longitudinal edge of the pan. This may be accomplished by adjustment of the screw 26 to project the adjustment plate 24 into a number of angularly related positions which widen the taper effect of the bottom of the pan.

The necessity of the several adjustments referred to is readily determined by the operator during the distribution of material and operation of the revolving pan P from his position in the doorway D–W of the silo. An initial adjustment of the positioning of unit U concentrically of the silo, as well as the proper angulation of pan P, is made by the operator when my apparatus is first mounted, and in this initial adjustment, the supporting tubes 15 and cross head 14 are usually disposed radially of the interior of the silo. From that position adjustment angularly of the track 15 from radial position, as well as longitudinal adjustment of the unit on rails 15 can readily be detected and may be quickly accomplished.

The recited adjustments, including the length of the supporting track structure 15, are such that conventional silos of all shapes and diameter may be successfully filled with silage and similar material without need of an operator to climb interiorly of the silo and spread or work from the top of the accumulated material.

Adjustment of angulation of the pan-like distributor medium for different heights within the confines of the silo is of substantially equal importance with the wide range of adjustability of the positioning of the unit within the silo.

From the foregoing it will be seen that I have provided comparatively simple and highly efficient apparatus for uniformly distributing silage and other coarse and sticky forage crops within vertical bins such as silos varying very widely in shape, size and internal dimensions.

It will of course be understood that various changes may be made in the form, details, arrangement and proportions of the various parts without departing from the scope of my invention.

What is claimed is:

1. In a powered silage distributor assembly for uniformly distributing silage and the like into vertical bins and silos which vary substantially in dimensions, the combination with a distributor unit having a mounting for a motor and for a shaft driven from said motor, and also having a revoluble pan-like, declined dispensing medium supported below said mounting and driven by said shaft for revolution on a vertical axis having a predetermined relation to said mounting,
   those improvements which have in combination,
   an overhanging, rigid, unit-support extending into a silo,
   means for supporting the outer end of said support from portions of said silo, said distributor unit being adjustably mounted upon said overhanging support for horizontal adjustment longitudinally thereof,
   a concave silage-guiding chute for guiding material downwardly onto the upper end of said declined, pan-like dispensing medium to receive silage from the upper discharge end of a blower spout, and
   means for angularly adjusting said overhanging unit-support on a vertical axis.

2. In a powered silage distribtuor assembly for uniformly distributing silage and the like into vertical bins and silos which vary substantially in dimensions, the combination with a distributor unit having a mounting for a motor and for a rotary shaft driven from said motor, and also having a revoluble pan-like, declined dispensing medium supported below said mounting and driven by said shaft for revolution on a vertical axis having a predetermined relation to said mounting,
   those improvements which have in combination,
   a rigid unit- support supported from portions of said silo and shiftable to a number of adjusted positions relative to the longitudinal or axial center of said silo,
   means for adjusting the angulation of said declined dispensing medium relative to the vertical,
   a concave silage-guiding chute for guiding material downwardly onto the upper end of said declined, pan-like dispensing medium, and
   said unit-support being swingably adjustable on a vertical axis disposed eccentric to the axial center line of said silo,
   and means for positively securing said unit-support in a multiplicity of swingably adjusted positions.

3. The structure set forth in preceding claim 2, further characterized by the axis for adjustable swinging of said support being vertical and disposed adjacent an opening in the upper portion of said silo and readily controllable by an operator positioned at said opening.

4. In a powered silage distributor assembly for uniformly distributing silage and the like into vertical bins and silos which vary substantially in dimensions, the combination with a distributor unit having a mounting for a motor and for a rotary shaft driven from said motor, and also having a revoluble pan-like, declined dispensing medium supported below said mounting and driven by said shaft for revolution on a vertical axis having a predetermined relation to said mounting, those improvements which have in combination, a rigid unit-support supported from portions of said silo and shiftable to a number of adjusted positions relative to the longitudinal or axial center of said silo, a concave silage-guiding chute for guiding material downwardly onto the upper end of said declined pan-like dispensing medium, said declined dispensing medium having a bottom with an outer distributor end and defined by a trailing longitudinal edge extending substantially radially of said rotary shaft, and a second longitudinal leading edge converging generally relative to said trailing edge from the upper portion thereof to the lower portion thereof, material received from said concave silage-guiding chute being distributed in part from said trailing edge, from said leading converging edge, and from the outer end of said bottom plate, means for varying the lateral dropping of material from said converging leading edge, said means comprising an elongated plate shiftably connected with said bottom for varying lateral protrusion beyond the leading edge of said plate, and means for variably shifting the protrusion of said plate and for retaining said plate in the varied positions of protrusion.

5. The structure set forth in the preceding claim 4, wherein the leading converging edge of said bottom is defined at least at its upper portion by a concave curve, and wherein said shiftable elongated plate is pivoted at its forward portion to the outer portion of said bottom, and shiftable by swinging from the position slightly trailing said leading edge to a variety of protrusive positions forwardly of said leading edge.

References Cited

UNITED STATES PATENTS

| | | | |
|---|---|---|---|
| 3,175,668 | 3/1965 | Stoltzus | 302—60 X |
| 3,262,586 | 7/1966 | Smiley et al. | 302—60 X |
| 3,349,929 | 10/1967 | Berger. | |

ANDRES H. NIELSEN, Primary Examiner